United States Patent [19]

Oliver et al.

[11] 4,002,469

[45] Jan. 11, 1977

[54] SEPARATION OF METALS

[75] Inventors: Raymond Edward Oliver, Johannesburg, South Africa; George McGuire, London, England

[73] Assignee: Matthey Rustenburg Refiners (Pty) Ltd., Johannesburg, South Africa

[22] Filed: Mar. 18, 1975

[21] Appl. No.: 559,425

[30] Foreign Application Priority Data

Mar. 21, 1974 United Kingdom ............ 12599/74

[52] U.S. Cl. .............................. 75/101 R; 75/115; 75/118 R; 75/121; 423/36; 423/52; 423/98; 423/109; 423/146

[51] Int. Cl.² ........................................ C22B 11/04

[58] Field of Search ................. 75/116, 115, 101 R, 75/121, 118 R; 423/36, 52, 98, 109, 146

[56] References Cited

UNITED STATES PATENTS

| 381,809 | 4/1988 | Oxland et al. ................... 75/118 X |
|---|---|---|
| 1,305,788 | 6/1919 | Ferguson ........................ 75/117 X |
| 2,098,025 | 11/1937 | Booge et al. .................... 75/116 X |

Primary Examiner—G. Ozaki
Attorney, Agent, or Firm—Cushman, Darby & Cushman

[57] ABSTRACT

This invention relates to refining platinum group metal concentrate and the separation therefrom of silver and the majority of base metals which are present in them. In more detail, the process comprises the steps of:

a. contacting a solid particulate mixture of base, silver and precious metal components, any of which may be in metallic or in chemically combined form, with substantially anhydrous sulphuric acid at a temperature which is sufficiently high for most of the base metal and silver components to form water soluble sulphates and b. separating the said water soluble sulphates from the solid precious metal-containing components by contacting the product from step (a) with a dilute aqueous solution or water and dissolving therein the said water soluble sulphates formed in step (a).

10 Claims, 1 Drawing Figure

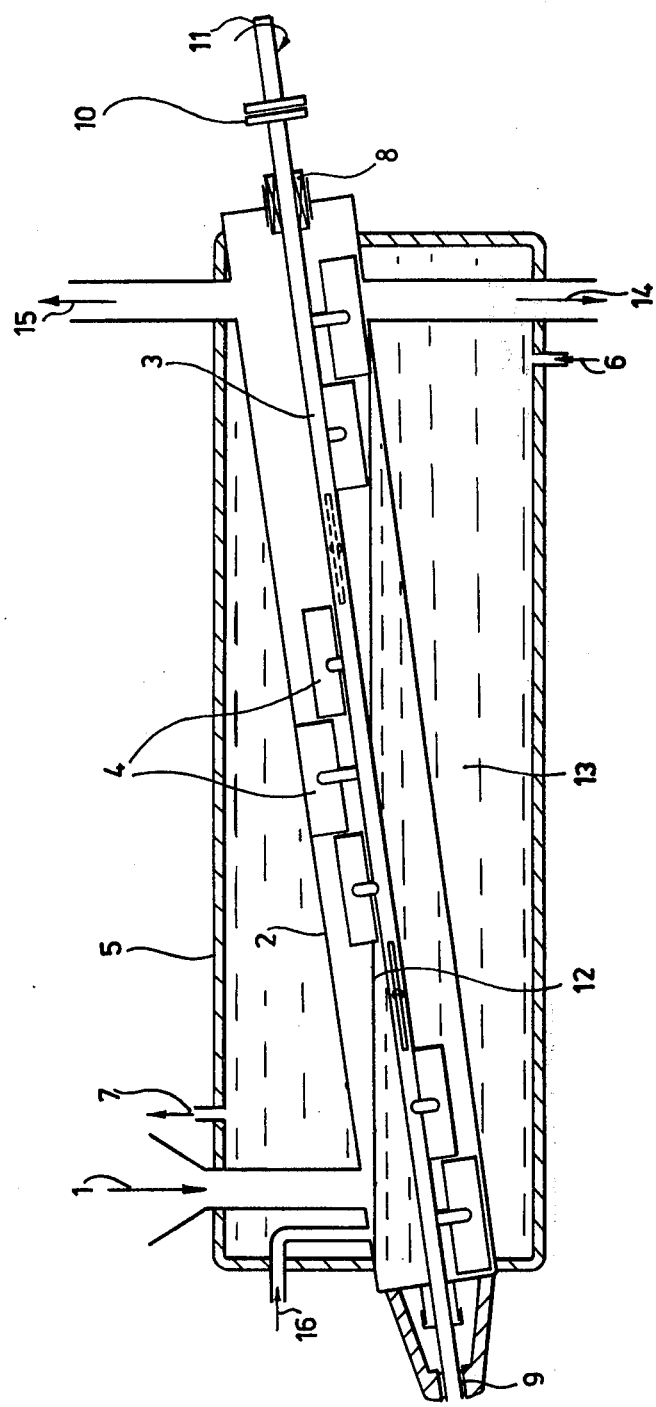

SEPARATION OF METALS

This invention relates to the refining of metal. In particular the invention is concerned with refining platinum group metal concentrate and the separation therefrom of silver and of the majority of the base metals which are present with them.

In this specification by "precious metal" we mean gold and any one or more of the platinum group metals (i.e. Ru, Rh, Pd, Os, Ir and Pt) and by "base metal" we mean any one or more of the metals other than silver, gold and the platinum group metals.

Material requiring refining may be a mixture containing precious metal, base metal and/or silver components either in metallic form or combined in the form of chemical compounds. It is an object of the present invention to provide a simple and effective refining process whereby a substantial proportion of the said silver and the said base metal components present in the said mixture are separated from the precious metal components and the concentration of the precious metal is thereby significantly increased.

According to one aspect of the present invention a process for the separation of components of base metal and silver from components of precious metal comprises the steps of:
 a. contacting a solid particulate mixture of base, silver and precious metal components, any of which may be in metallic or in chemically combined form, with substantially anhydrous sulphuric acid at a temperature which is sufficiently high for most of the base metal and silver components to form water soluble sulphates, and
 b. separating the said water soluble sulphates from the solid precious metal-containing components by contacting the product from step (a) with a dilute aqueous solution or water and dissolving therein the said water soluble sulphates formed in step (a).

Advantageously the process is applied to a solid particulate mixture which comprises a mineral concentrate containing one or more of the elements: Sb, Sn, Pb, Zn, Cu, Ni, Fe, As, Se, Te, and S.

By substantially anhydrous sulphuric acid we mean concentrated sulphuric acid containing not more than 10% by weight of water. Concentrated $H_2SO_4$ plus $SO_3$ oleum may also be used.

Treatment of the solid particulate mixture with substantially anhydrous sulphuric acid is preferably carried out at a temperature greater than 100° C and more preferably at a temperature within the range of 140°–250° C. At temperatures below 100° C the reaction becomes progressively slower. At temperatures greater than 200° C dissolution of precious metal increasingly takes place.

Treatment of precious and base metal and silver concentrates with substantially anhydrous sulphuric acid converts many of the base metal components, particularly the sulphides of iron, copper and nickel, into water soluble sulphates. The method of the invention is particularly applicable to the treatment of platinum group metal ores where the base metals are largely in the form of sulphides.

In some of these cases, pre-treatment with dilute mineral acid may be advantageous before operating the process of the invention. In this connection suitable aqueous solutions which may be used in place of water in step (b) are dilute mineral acids such as dilute sulphuric acid solution.

Treatment with dilute sulphuric acid or water after treatment with substantially anhydrous sulphuric acid may be carried out by adding the reaction mixture, after it has been allowed to cool, to dilute sulphuric acid or water. Alternatively, the solid residue may be removed, for example by filtration, and then treated with dilute sulphuric acid or water. In either case the sulphuric acid may be recovered. This is carried out by chemical or electrochemical treatment to remove base metal values such as nickel and copper and the acid is then re-concentrated and may be reused in the process of the present invention.

Preferably the solid particulate mixture is in the form of powder having a British Standard mesh size falling within the range 20–300.

According to a second aspect of the present invention an apparatus for carrying out the process of the present invention comprises:
 a. a reaction chamber having
 b. separate inlet means for particulate solid and substantially anhydrous sulphuric acid;
 c. means for stirring together the solid and the acid in the reaction chamber, and
 d. outlet means for product, the outlet means having an opening into the chamber above the level of the sulphuric acid-solid mixture.

Conveniently, the reaction chamber has an associated heating means such as a constant temperature oil jacket. In one form of apparatus, the heating means surrounds the reaction chamber.

Preferably, the reaction chamber is cylindrical and is inclined with the separate inlet means for the particulate solid and the anhydrous sulphuric acid disposed towards the lower end thereof. In this form of reaction chamber, the means for stirring together the particulate solid and the acid may comprise a rotatable shaft mounted coaxially with respect to the cylindrical chamber and carrying a plurality of paddles. Further, in this form of reaction chamber, the inlet means for the introduction of particulate solid and anhydrous sulphuric acid is positioned below the outlet means for the reactive product so that under the influence of the rotatable paddles and by further addition of particulate solid and acid, the reacting slurry travels slowly up the sloping reaction chamber and overflows into the outlet means. The rotatable paddles may be offset on the axial shaft in order to equalise the load on the bearings of the said shaft.

In an alternative construction, the reaction chamber may be of rectangular cross-section and a system of wiers employed for separating the slurry from the acid solution.

Where the heating means is in the form of a constant temperature oil jacket, the jacket includes connections for the inlets for acids and the particulate solid as well as the product discharge outlet. Constant temperature oil is recirculated through the jacket.

One form of the apparatus according to the present invention will now be described by way of example and with reference to the accompanying schematic FIGURE.

Particulate solid is introduced through feed hopper 1, into a mild steel cylindrical reaction tube 2. A rotatable shaft 3, carrying a plurality of paddles 4, offset from each other along the length of the shaft is coaxially mounted within the tube 2. A lagged, constant temperature oil jacket 5, surrounds the reaction tube and oil 13 is introduced through an oil inlet means 6, and leaves through an outlet means, 7. The rotatable shaft 3, is supported by bearings 8 and 9, and driven through a clutch 10, by a chain or other drive applied at position 11. The sulphuric acid-solid slurry is maintained at a level 12, and anhydrous sulphuric acid is introduced into the reaction tube 2 through an inlet 16. Product emerges from outlet 14 under gravity, the edges of the outlet serving as a wier. Suction is maintained at outlet 15, in order to remove any acid mist and gases produced during the course of the reaction. Subsequent treatment with dilute sulphuric acid or water is as described above.

The product, after dissolution of the water soluble base metal and silver sulphates formed during the course of the reaction, is considerably richer in precious metal as compared with the starting material. This is illustrated in the table below which shows typical mean analyses of starting material fed to the reaction tube in the manner described above and also typical mean analyses of the product.

The "balance" of the composition of the starting material and the product consists of mainly refractory oxides. It also contains other base metals and non metals. The starting material was prepared by treating a precious metal concentrate containing about 1% by weight of precious metal with dilute sulphuric acid. The dried product was then used as starting material:

|  | Starting Material % by weight | Product % by weight |
|---|---|---|
| Pt | 3.81 | 23.54 |
| Pd | 2.47 | 15.26 |
| Ir | 0.12 | 0.75 |
| Ru | 0.53 | 3.14 |
| Rh | 0.34 | 2.08 |
| Os | 0.08 | 0.19 |
| Au | 0.55 | 3.54 |
| Ag | 1.00 | 0.30 |
| Cu | 54.40 | 2.30 |
| Ni | 6.10 | 3.10 |
| Fe | 2.70 | 1.00 |
| S | 20.70 | 1.50 |
| Balance | 7.20 | 43.30 |
|  | 100.00 | 100.00 |

These results were obtained using a temperature within the range 190°–195° C and a residence time for particulate solid of 30 minutes.

What we claim is:

1. A process for the separation of base metal and silver components from a solid particulate mixture thereof with precious metal which comprises the steps of:
   a. contacting said solid particulate mixture of base metal, silver and precious metal components, any of which may be in metallic or in chemically combined form, with substantially anhydrous sulphuric acid at a temperature within the range of 140° to 250° C and which is sufficiently high to convert most of the base metal and silver components to water soluble sulphates while leaving the precious metal component in an essentially water insoluble solid state and
   b. separating the said water soluble sulphates from the solid precious metal component by contacting the product from step (a) with water and dissolving therein the said water soluble sulphates formed in step (a).

2. A process according to claim 1 in which the sulphuric acid contains not more than 10% by weight of water.

3. A process according to claim 1 in which the sulphuric acid also contains $SO_3$.

4. A process according to claim 1 in which the solid particulate mixture is in the form of a powder having a British Standard mesh size falling within the range 20–300.

5. A process according to claim 1 in which the temperature of reaction is within the range 190° – 195° C.

6. A process according to claim 1 in which the water in step (b) is in the form of a dilute aqueous solution of sulphuric acid.

7. A process according to claim 1 in which the solid particulate mixture is contacted with acid in a sloping tube.

8. A process according to claim 1 in which the solid particulate mixture comprises a mineral concentrate.

9. A process according to claim 8 in which the mineral concentrate contains one or more of the elements: Sb, Sn, Pb, Zn, Cu, Ni, Fe, As, Se, Te, and S.

10. A process for refining a mineral concentrate comprising a solid particulate mixture of silver, at least one precious metal selected from the group consisting of gold and platinum group metals, and at least one base metal component from the group consisting of Cu, Ni and Fe so as to separate the silver and base metal components from said precious metal component, said process comprising the steps of:
   a. contacting said solid particulate mixture of base metal, silver and precious metal components, any of which may be in metallic or in chemically combined form, with substantially anhydrous sulphuric acid containing $SO_3$ and not more than 10% by weight of water, at a temperature within the range of 140° to 250° C whereby most of the base metal and silver components are converted to water-soluble sulphates while leaving the precious metal component in an essentially water-insoluble solid state, and
   b. separating the said water-soluble sulphates from the solid precious metal component by contacting the product from step (a) with water and dissolving therein the said water-soluble sulphates formed in step (a).

* * * * *